United States Patent [19]

Rushton

[11] 3,933,576

[45] Jan. 20, 1976

[54] EVAPORATION OF RADIOACTIVE WASTES

[75] Inventor: William E. Rushton, South Holland, Ill.

[73] Assignee: Whiting Corporation, Harvey, Ill.

[22] Filed: May 17, 1973

[21] Appl. No.: 361,208

[52] U.S. Cl....... 159/27 A; 159/28 R; 159/DIG. 12; 165/74; 252/301.1 W
[51] Int. Cl.². B01D 1/26; B01D 1/100; B01D 1/06; C09K 3/00
[58] Field of Search.... 159/17 R, 27 R, 27 A, 27 B, 159/27 E, 28 R, DIG. 12, 25 A, 34, 23, 45, 159/27 F, 1 C; 165/72, 73, 74, 107; 252/301.1 W

[56] References Cited
UNITED STATES PATENTS

| | | | |
|---|---|---|---|
| 841,030 | 1/1907 | Marshall | 159/25 A UX |
| 1,436,739 | 11/1922 | Webre | 159/27 A |
| 1,791,281 | 2/1931 | Morse | 23/312 |
| 1,832,412 | 11/1931 | Newton | 165/74 X |
| 1,835,620 | 12/1931 | Webre | 159/25 A |
| 1,953,293 | 4/1934 | Forncrook | 165/74 |
| 1,975,560 | 10/1934 | Sollich | 159/3 |
| 2,695,869 | 11/1954 | Sondermann | 202/52 |
| 2,991,161 | 7/1961 | Gasche | 165/74 X |
| 3,057,603 | 10/1962 | Isreeli | 165/74 |

FOREIGN PATENTS OR APPLICATIONS

| | | | |
|---|---|---|---|
| 158,569 | 6/1922 | United Kingdom | 159/27 A |
| 159,815 | 6/1922 | United Kingdom | 159/27 A |
| 1,381,450 | 11/1964 | France | 159/DIG. 12 |
| 1,199,253 | 7/1970 | United Kingdom | 159/45 |

*Primary Examiner*—Jack Sofer
*Attorney, Agent, or Firm*—Lockwood, Dewey, Zickert & Alex

[57] ABSTRACT

An evaporation system for radioactive waste concentration comprises an evaporation chamber, a heat exchanger, and a circulation pump arranged in an upstanding spaced-apart configuration and enclosed within a radiation shield whereby access to the system is limited and frequently only possible from overhead. The steam chest of the heat exchanger is suspended from a removable top plate to allow removal for repair or replacement without exposing maintenance personnel to radiation. A novel circulation pump having a vertical shaft and propeller supported from a top plate which can be removed from overhead also allows maintenance or replacement of the pump without exposure to radiation or having to drain the system.

13 Claims, 6 Drawing Figures

FIG_4

EVAPORATION OF RADIOACTIVE WASTES

BACKGROUND OF THE INVENTION

The present invention relates generally to evaporator installations, and more particularly to evaporators for processing radioactive liquid wastes in a nuclear power plant.

Until relatively recently the need for an evaporator system in nuclear power plants was confined to controlling the concentration of primary water, i.e. the liquid heat transfer medium between the atomic pile and the steam generators of the plant. This liquid, which normally contains sodium sulphate or boric acid, was sufficiently free of scale forming contaminants and sufficiently uniform in concentration that it could be evaporated without excessive scaling in a conventional calandria or long-tube-vertical (LTV) evaporator, wherein circulation through the heat exchanger was obtained by thermal gradients, as opposed to pumping or other mechanical circulation means.

It has recently been recognized in the operation of nuclear power plants that liquids accummulated from floor drainage systems and other internal reactor-related sources constitute a potential radiation hazard, and must therefore be handled and disposed of as radioactive waste material, typically by sealing the waste in concrete drums or barrels, and then burying it either on land or at sea. Because of the relatively high expense of the disposal process, it is highly desirable that the radioactive liquid waste be concentrated prior to being sealed in the containers for burial. To this end the waste may be first processed in one or more evaporator stages, wherein a large portion of the liquid is removed as harmless non-radioactive steam or water vapor leaving concentrated liquor for disposal.

Unfortunately, the concentrated waste liquor, which unlike primary water may contain suspended solids such as calcium, sodium and magnesium carbonates and sulphates in variable and unpredictable concentrations, is prone to boil and produce scaling in the heat exchanger and the other components of the conventional calandria and LTV natural flow evaporator systems heretofore used in the primary water concentrating process. This eventually reduces the efficiency of the evaporator to the point that its utility in the concentrating process is seriously impaired. While it is possible to remove some of the accummulated scaling by boiling out the evaporator system with a suitable solvent, it eventually becomes necesaary to shut down and dismantle the system so that insoluble scales and plugged tubes can be cleaned by mechanical means. Because the liquor within the evaporator systems is highly radioactive and the systems are therefore normally installed in concrete vaults for shielding and are not easily accessible, dismantling prior-art systems for descaling or repair has been a time-consuming and expensive operation.

While forced circulation (FC) evaporators, where a pump or other mechanical circulation means is provided to circulate the liquor, overcome the scaling problem to a large degree by keeping the liquor circulating at a controlled rate with carefully controlled temperature gradients within the heat exchanger whereby boiling is restricted to the evaporation chamber, the use of these evaporators for concentrating radioactive liquids has been avoided in the past because of their use of a pump. Heretofore, such pumps, which were arranged below the level of the liquid in the system and therefore necessarily required a shaft seal resistant to the passage of the fluid being pumped, required frequent servicing which could be accomplished only with great difficulty because of the surrounding radiation shielding and the high radiation levels of the liquor. Furthermore, the use of a pump was considered objectionable because it increased the volume requirements of the system and made necessary additional access passageways, thus significantly increasing the required radiation shielding around the evaporator.

Accordingly, it is a general object of the present invention to provide a new and improved evaporator system for concentrating radioactive liquid wastes in a nulcear power plant or the like.

It is a more specific object of the present invention to provide an evaporator system for a nuclear power plant or the like which can be more readily dismantled for descaling or repair.

It is a still more specific object of the present invention to provide a new and improved evaporator system which can be serviced without being drained.

It is another object of the present invention to provide an evaporator for a nuclear power plant which minimizes scaling and the need for periodic maintenance.

It is another object of the present invention to provide an evaporator system which can be serviced from one access plane.

It is another object of the present invention to provide a new and improved pump mounting and assembly for an evaporator system.

It is another object of the present invention to provide a circulation pump for an evaporator system which provides a minimal need for periodic maintenance.

It is another object of the present invention to provide a circulation pump for an evaporator system which can be serviced from one access plane without draining the system.

SUMMARY OF THE INVENTION

To attain the objectives of this invention, an evaporator system is provided wherein the residence time of the radioactive waste in the heater tubes as well as the amount of heat transferred to the liquid during its passage through the tubes can be controlled, which permits minimization of scale formation. Furthermore, all components conventionally requiring servicing are arranged for convenient removal through an access port formed in the roof of the radiation chamber, and the arrangement and configuration of the components commonly requiring service is such as to minimize the need for frequent attention, particularly in the design and location of the troublesome pump shaft seal.

As will be subsequently noted, the evaporator includes an upright evaporation chamber providing a vapor head space above the intended liquid level and adapted to operate under atmospheric pressure. Conduit means interconnect the evaporation chamber with a pump chamber which supports on its removable head a pump drive from which is suspended a pump shaft and propeller, the pump shaft extending above the level of the liquid in the chamber. The pump operates to force the radioactive liquid waste from the pump chamber through second conduit means to an upright heat exchanger at a predetermined rate, the heat exchanger communicating by third conduit means with the evaporator chamber to form a closed loop.

The tubes of the heat exchanger and the steam chest which surrounds the tubes are secured to a removable head, thus permitting removal of the tube bundle and steam chest as a unit from the access opening in the chamber roof. A removable head is also provided on the evaporator chamber to permit removal of a demisting device.

The pump propeller is arranged in a channel of circular cross section which fits closely about the propeller tips in such manner that in operation the force of the fluid driven by the propeller also centers the propeller and eliminates the need for an immersed bearing. It is therefore possible by removing the horizontal pump mounting plate or head to remove the motor, the pump gear box, the pump shaft, the propeller, and the pump shaft seal as a unit through an overhead access opening. Furthermore, since the shaft seal is not required to withstand hydrostatic pressure or appreciable vapor pressure, it is capable of extended operation without maintenance or replacement.

DESCRIPTION OF THE DRAWINGS

The features of the present invention which are believed to be novel are set forth with particularity in the appended claims. The invention, together with the further objects and advantages thereof, may best be understood by reference to the following description taken in connection with the accompanying drawings, in the several figures of which like reference numerals identify like elements, and in which:

DESCRIPTION OF THE PREFERRED EMBODIMENT

Figure 1:
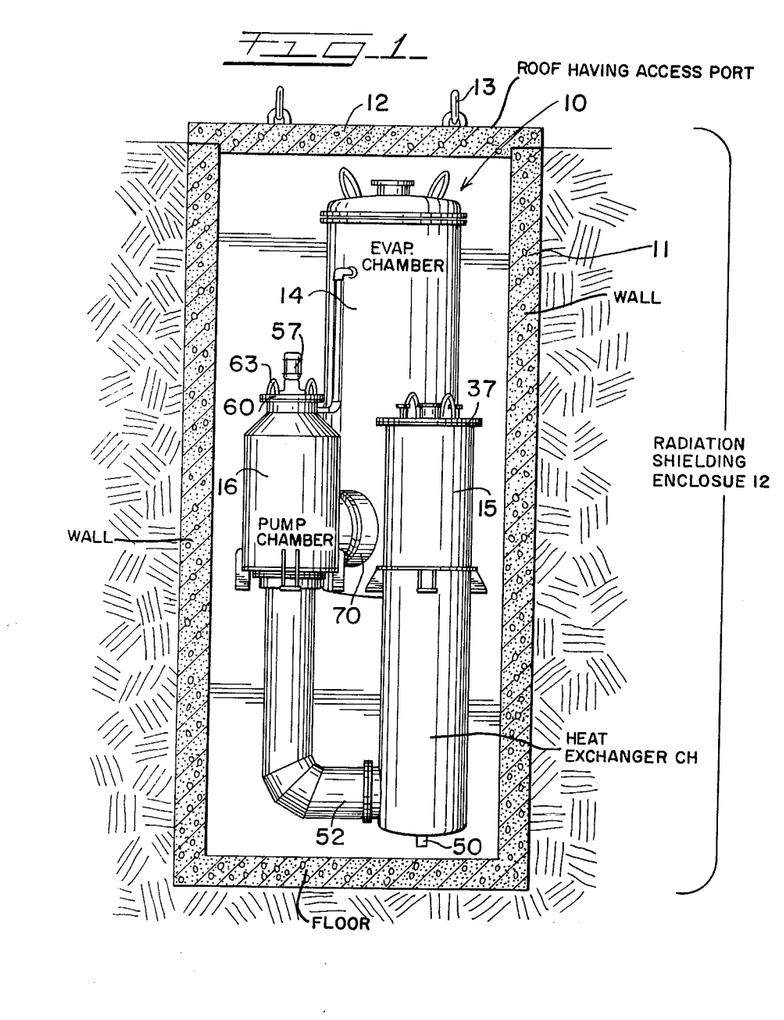
FIG. 1 is a side elevational view of an evaporator system constructed in accordance with the invention.
Figure 2:
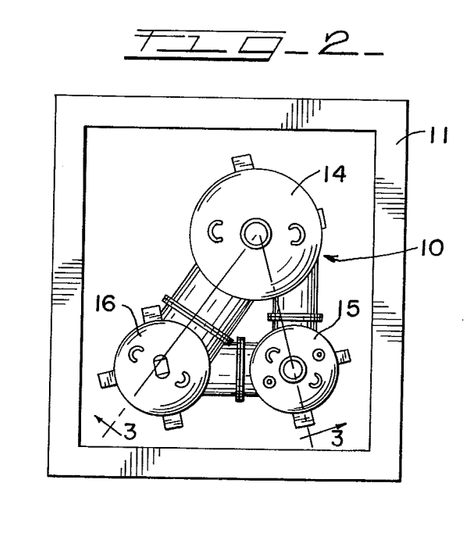
FIG. 2 is a cross sectional view of the evaporator of FIG. 1.

In the embodiment of the invention illustrated in FIGS. 1 and 2, the reference numeral 10 generally designates an evaporator system intended for processing radioactive liquid waste within the environment of a nuclear power plant. For purposes of radiation shielding the evaporator system 10 is enclosed within a vault 11, which preferably includes a top cover 12 adapted to be removed by means of lift rings 13 for access to the system. In practice the walls of the vault are constructed of concrete or other suitable shielding material and may be over three feet thick to provide the necessary degree of shielding.

Basically, the evaporator system comprises three units; a cylindrical evaporation chamber 14, a heat exchanger 15, and a circulation pump 16. The three units are arranged in a triangular upstanding spaced-apart configuration to minimize space requirements and to permit the units to be interconnected by short straight pipe segments. While other arrangements are possible, including those illustrated in FIGS. 5 and 6 and the use of separate shielded enclosures for each unit, the arrangement illustrated is preferred for reasons of economy of construction and efficiency of operation.

Figure 3:
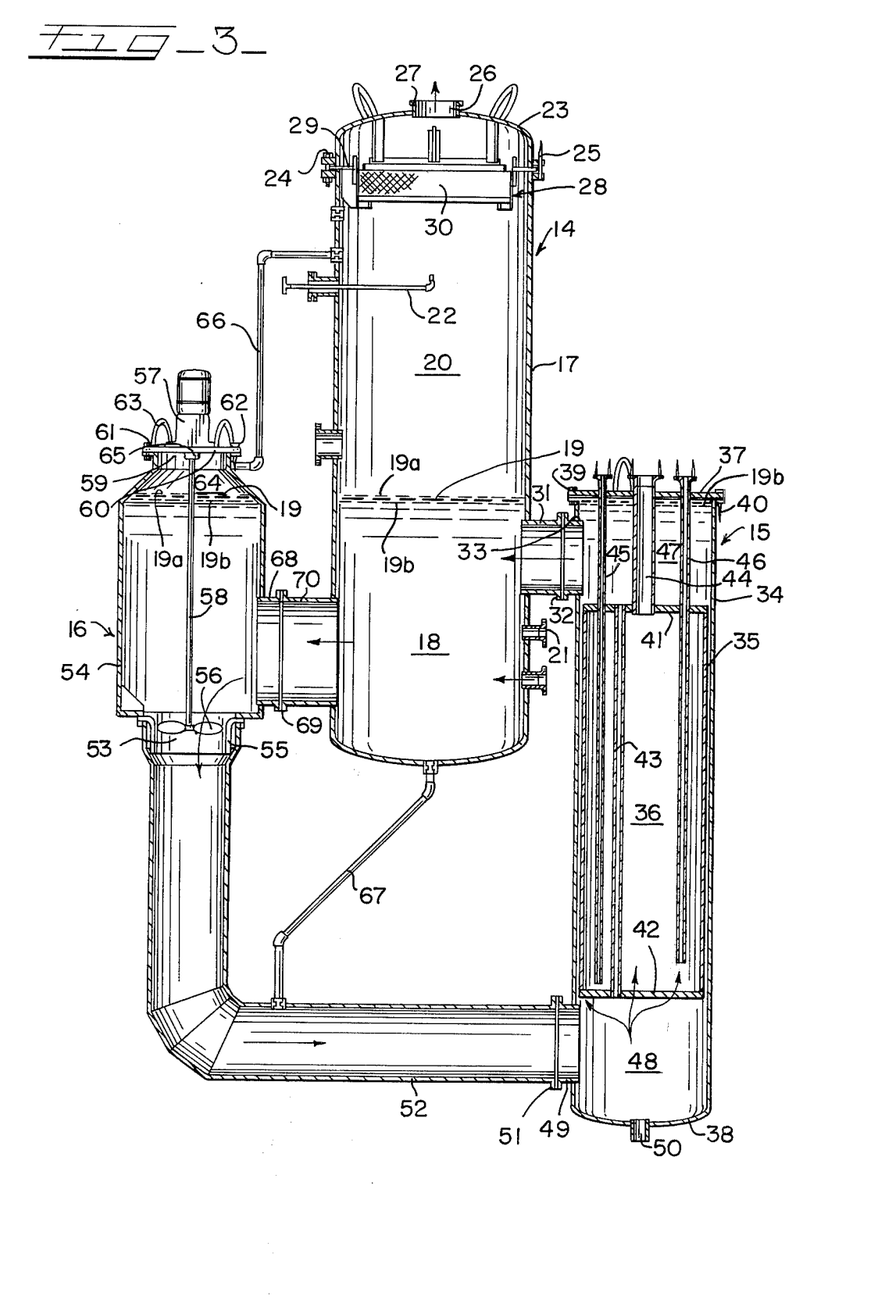
FIG. 3 is a plan view of the evaporator system taken along lines 3—3 of FIG. 2.

Referring now to FIG. 3, the evaporation chamber 14 is seen to comprise a cylindrical tank 17 within a lower portion of which the liquor 18, i.e. the waste liquid being concentrated, is normally maintained at a predetermined level 19 such that a vapor head space 20 is formed in an upper portion of the tank. In operation, it will be understood that the actual level of the waste liquid will vary from the nominal level 19, ranging from a maximum level 19a to a minimum level 19b. One or more inlet ports 21 may be provided for introducing liquor into the tank, and a conventional pressure sensing probe 22 may be provided in the upper portion for measuring vapor pressure in the vapor head space. The cylindrical tank 17 preferably includes a dome-shaped cover section 23 fastened over its top end by means of a plurality of bolts 24 and guide pins 25, or other appropriate fastening means, arranged in a conventional bolt-circle configuration on abutting flanges of the two elements. Cover 23 includes a vertical steam discharge pipe section 26 extending therefrom which terminates in an upwardly facing flange 27 for connection to additional piping (not shown).

To prevent potentially radioactive liquid within vapor head space 20 from leaving the system, an entrainment separator 28 is provided at the top of the evaporation chamber between discharge pipe 26 and vapor head space 20. This separator comprises a baffle plate 29 on which a demister basket 30 of fine wire mesh is mounted to catch liquid particles as they attempt to exit the evaporator.

The lower portion of evaporation chamber 14 communicates with heat exchanger 15 by means of a pipe section 31 which extends into the side of chamber 14 below the nominal level 19 of the liquor 18. This pipe section may be connected by means of a suitable expansion joint 32 to another pipe section 33 which extends into heat exchanger 15.

Heat exchanger 15 basically is a long tube vertical (LTV) heat exchanger having a cylindrical body 34 within which the cylindrical body 35 of a steam chest 36 is coaxially disposed. The cylindrical body 34 of the heat exchanger is closed at its top end by a flat cover plate 37, and at its bottom end by an integral dome shaped end section 38. Cover plate 37 is preferably fastened to body 34 by means of a plurality of bolts 39 and guide pins 40 arranged in a conventional bolt-circle configuration about the periphery of adjacent flanged edges of the two elements.

To contain the steam or other heating medium introduced into steam chest 36, a pair of multiple-apertured tube sheets 41 and 42 are fitted to the body 35 of the steam chest at its top and bottom ends, respectively. These tube sheets support a plurality of vertically extending steam tubes 43 which extend between the apertures of the tube sheets to facilitate heat transfer from the steam chest to the liquor. Steam is introduced into steam chest 36 by means of a conduit 44 which extends vertically through end plate 37 and tube sheet 41. Condensate is removed from steam chest 36 by means of another conduit 45 which extends from a location near the bottom of the steam chest 36 through tube sheet 41 and end plate 37. An additional conduit 46 extending from a slightly higher position in steam chest 36 through tube sheet 41 and end plate 37 is provided to exhaust non-condensables, e.g. non-condensed steam and other gases, from the steam chest. All three of the conduits 44, 45, and 46 are terminated with upwardly-facing flange joints for connection with input and output conduits (not shown).

Tube sheets 41 and 42 respectively, in part define output and input chambers 47 and 48 at the top and bottom ends of heat exchanger 15. Liquor is introduced into the bottom chamber 48 by way of pipe segments 49, and is removed from the top chamber 47 by means of pipe segments 31 and 33. A drain pipe 50 is preferably provided at the bottom of the end portion 38 of the heat exchanger body 34 to enable liquor to be drained from the system to a down-line barreling station (not shown).

Pipe segment 49 is coupled by means of a flange 51 to a pipe segment 52 which extends horizontally and then vertically to transport the heated liquor from heat exchanger 15 to the inlet 53 of a circulation pump 16. This pump comprises a generally cylindrical housing 54 necked down at one end to form inlet 53, a vertically extending cylindrical portion of which substantially corresponds in diameter to pipe segment 52. An upwardly and outwardly tapered throat section 55 of reduced diameter may be inserted in inlet 53 to obtain smoother liquor flow to provide a better defined liquor flow pattern in connection with the propeller to be presently described.

Circulation of the liquor within the evaporator system is obtained by means of a propeller 56 disposed within throat section 55. Propeller 56 is suspended from a motor and gear reduction assembly 57 mounted near the top of housing 54 by a shaft 58 which extends vertically downward from the motor. No bearing support is provided at the lower end of the shaft since in operation the radial hydro-dynamic force developed between the turning propeller and the inner walls of throat member 55 can be relied upon to center the propeller. Pump housing 54 extends upwardly, necking down to a top opening or access port 59 of reduced diameter above the nominal level 19 of the liquor 18 in the system. In practice the vertical height of the pump housing above propeller 56 must provide a sufficient head of liquor above the propeller to prevent cavitation or vortex formation as the propeller turns. In practice a three-foot head is required above the propeller for proper operation.

The motor and pump assembly 57 is mounted on a flat cover plate 60, which in turn is fastened over access port 59 by means of bolts 61 and guide pins 62 arranged in a conventional bolt-circle configuration about the periphery of adjacent flanges on the two members. A pair of lift rings 63 may be provided on either side of the motor and gear reduction assembly 57 to facilitate removal of the assembly for repairs and/or replacement. In this connection it is important to note that the level of the liquor in pump housing 54 is identical to that in evaporation tank 17, forming a vapor head space 64 within the housing which enables the cover plate 60 to be removed without draining or spilling the liquor and obviates the need for a liquid seal between shaft 58 and top plate 60. Instead, a simple flange seal 65 suffices to seal in the non-radioactive atmospheric-pressure vapor given off by the liquor. A vapor relief conduit 66 is provided between the vapor head space of circulation pump 16 and the vapor head space of tank 17 for the purpose of relieving the vapor pressure which would otherwise build up within pump housing 54.

Another conduit 67 is connected between the bottom of chamber 14 and pipe 52 to permit evaporation tank 14 to be completely drained through discharge pipe 50 should it become necessary. The housing 54 of pump 16 communicates with evaporation chamber 14 below nominal liquor level 19 by way of pipe segment 68, a flange coupling 69, and a pipe segment 70.

In operation, the evaporation chamber 14 is filled through inlet pipe 21 to nominal level 19 with a waste solution to be concentrated for disposal. This solution is circulated through pipe segments 68 and 70 to the circulation pump 16, wherein it is forced onward by propeller 56 through pipe segments 49 and 52 to the inlet chamber 48 of heat exchanger 15. From there the solution flows upwardly through steam tubes 43 to outlet chamber 47, from where it is conveyed by pipe segments 31 and 33 back to evaporation chamber 14.

Upon each pass through steam tubes 43 the solution is heated by the steam in steam chest 36 until eventually the solution becomes hot enough to flash or vaporize upon entering evaporation chamber 14, causing a vapor head to be developed within vapor head space 20. The vapor thus developed, inherently non-radioactive, is exhausted to the atmosphere or to a down-line condenser stage (not shown) for conversion to a liquid state.

As the evaporator operates, the percentage of solids on the waste solution, or liquor, builds up slowly. The density of the liquor may be monitored, and when the liquor reaches a desired density a portion of the liquor may be drawn off through discharge pipe 50 while at the same time additional non-concentrated waste liquid may be added through inlet 21. This may continue until the percentage of solids in the liquor is sufficiently reduced to justify further operation of the evaporator system to increase liquor density. Thus, operation of the evaporator system may be continuous or in batches, depending on the rate of inflow of waste liquid and the particular requirements of the other components of the disposal system. The material discharged from port 50 may be highly radioactive and is normally transported immediately to a shielded barreling station wherein it is packaged in concrete containers for disposal. The barreling operation may be entirely conventional and therefore need not be described here.

In practice the liquor is circulated through heat exchanger 15 by circulation pump 16 at a rate such that then the temperature of the liquor in chamber 14 stabilizes the temperature gradient of the solution circulating through heat exchanger 15 is small, typically less than three degrees. Furthermore, the temperature of the steam in the heat exchanger and the rate of circulation of the solution are controlled so as to maintain the temperature differential between the steam and the liquor within a predetermined range, typically between 25°F. and 40°F. These cautions have the effect of minimizing scaling within heat exchanger tubes 43, thereby prolonging the time between required dismantling and cleaning operations.

Boiling of the liquor within the steam tubes, another major contributor to scaling, is minimized by locating the steam chest substantially below the level of the liquor in evaporation chamber 14. This confines boiling to the chamber 14, wherein scaling is not likely to occur and wherein the steam generated can be readily exhausted. Furthermore, the positioning of propeller 56 at the inlet of circulation pump 16, together with the use of circulation means in the form of wide, typically three foot diameter pipes, provides for moving the liquor at a high rate with minimum turbulence, a condition which must be maintained if minimum scaling is to be realized.

In accordance with the invention, the aforedescribed evaporator apparatus, even when installed in a vault or other confined area, lends itself to servicing and descaling operations. Specifically, and with reference to FIG. 4, by removing bolts 24, 39, and 61 all three stages of the evaporator are made accessible for service. In the case of evaporation chamber 14, after removing bolts 24 and the discharge pipe 26 connection at flange 27 the hemispheric dome 23 can be lifted off to expose demister basket 30. This basket can also be lifted off by means of lift rings provided on baffle 29 to clean or replace the demister or to gain access to the inside surface of evaporation tank 17.

Figure 4:
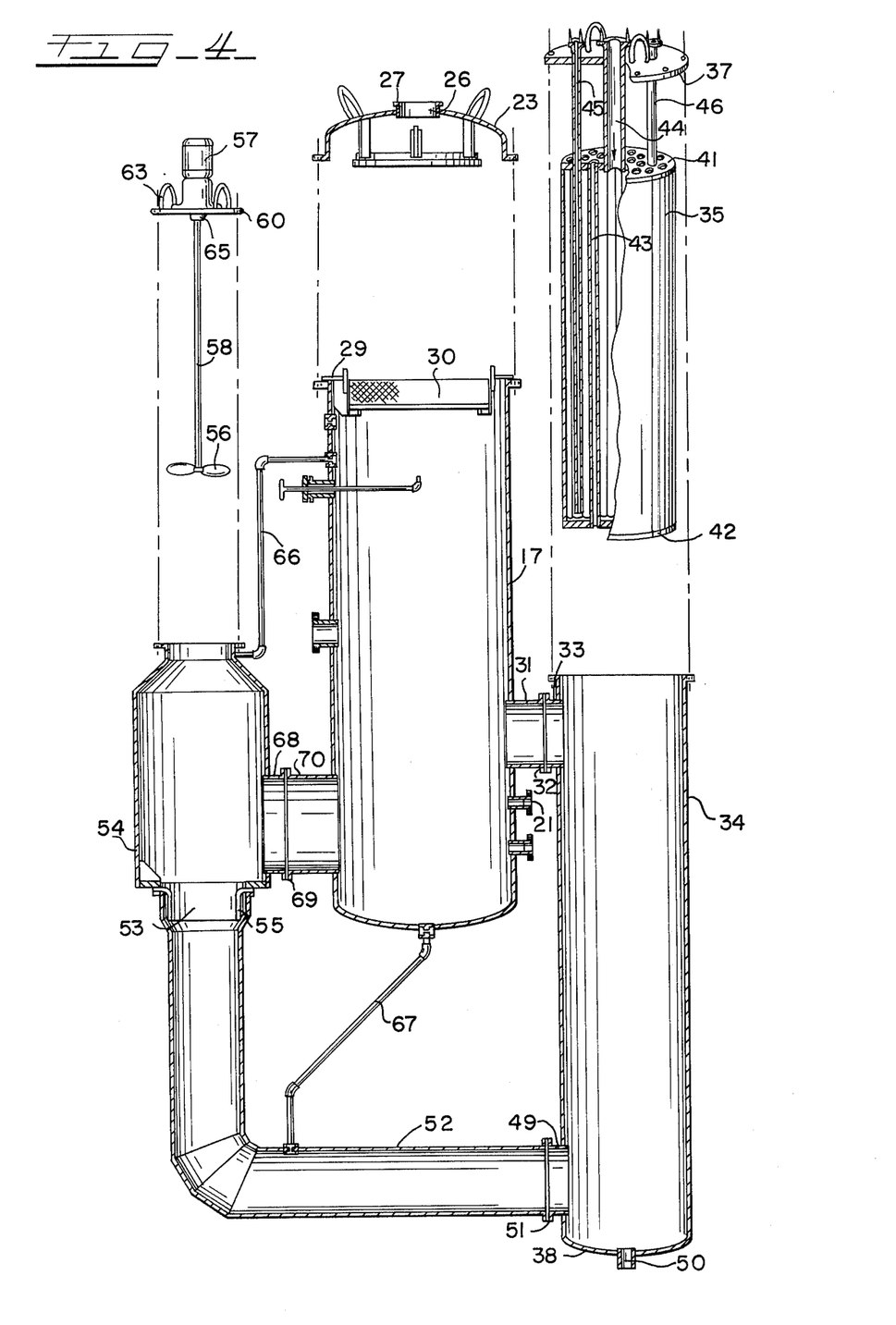
FIG. 4 is an elevational view, partially in cross-section, of the evaporator system taken along lines 3—3 of FIG. 2, but partially exploded to illustrate the disassembly of the evaporator for servicing.

In the case of heat exchanger 15, after removing bolts 39 and the pipes attached to conduits 44, 45, and 46, the entire steam chest 36 can be lifted clear by means of support rings on cover plate 37. This not only allows steam chest 36, the single component within the evaporator most subject to flaking, to be transported elsewhere for cleaning, but also gains access to the entire inside surface of the heat exchanger housing 34, including the bottom end 38 of the housing and drain pipe 50, which is subject to clogging.

Furthermore, by loosening bolts 61 the motor and gear reduction assembly 57 can be removed by means of lift rings 63 to gain access to propeller 56. The entire motor, gear box, and propeller can be removed as a single unit for replacement or repair. At the same time access is gained to the interior of the circulation pump housing for cleaning or other repairs should that become necessary.

Figure 5:
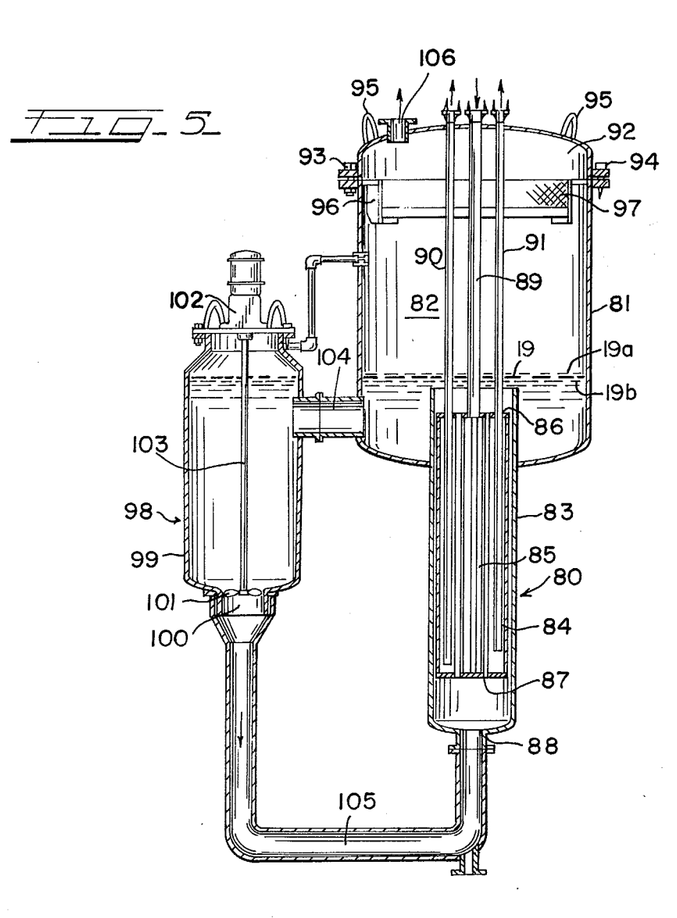
FIG. 5 is a cross-sectional view of an alternate embodiment of the invention.

An alternate embodiment of the invention is shown in FIG. 5. In this configuration an LTV-type heat exchanger 80 is situated directly beneath the cylindrical housing 81 of an evaporation chamber 82 such that one end of the heat exchanger extends up through the bottom of the housing into the chamber. The cylindrical body 83 of the heat exchanger encloses the cylindrical body 84 of a steam chest 85, a pair of multiple-apertured tube sheets 86 and 87 being fitted to the body at either end. The heat exchanger is open at its top end so as to communicate with the interior of the evaporation chamber, and is closed at its bottom end except for a vertical intake pipe section 88 by an integral dome-shaped end section. A conduit 89 is provided for introducing steam into the steam chest, and a pair of conduits 90 and 91 are provided for removing condensate and non-condensables. These conduits extend upwardly through a removable dome-shaped cover 92 and terminate in upwardly-facing flanges for connection to communicating piping. The dome-shaped cover section is fastened to housing 81 by a plurality of bolts 93 and guide pins 94 is removable from above, a pair of lift rings 95 being provided on either side of the cover for that purpose. A baffle plate 96 and a demister basket 97 are located near the top of the evaporation chamber to prevent liquid entrainments from escaping from the evaporation chamber.

As in the preferred embodiment, circulation is obtained by means of an electrically driven circulation pump 98, which comprises a generally cylindrical housing 99 necked down at one end to form an inlet 100 in which a propeller 101 is disposed. The propeller is suspended from a motor and gear reduction assembly 102 removably mounted at the top of housing 99 by a shaft 103 which extends vertically downward from the motor. Circulation pump 98 receives liquor from chamber 82 by way of a pipe segment 104, the operation of the system in other respects being substantially identical to that of the previously described preferred embodiment. A steam discharge pipe segment 106 is provided in cover 92 to exhaust the non-radioactive steam generated during operation of the system.

To remove the heat exchanger for cleaning or maintenance, all that is necessary is to disconnect the three conduits 89-91, loosen the cover plate 92 by removing the screw fasteners 93 about its periphery, and lift the entire assembly, consisting of the cover and the heat exchanger, clear of the evaporation chamber housing 81. This arrangement also has the advantage of requiring less area since the heat exchanger and the evaporator occupy the same floor space. This is a significant advantage in that it lessens the required amount of radiation shielding, without adversely affecting the accessibility of the system for cleaning and maintenance.

Figure 6:
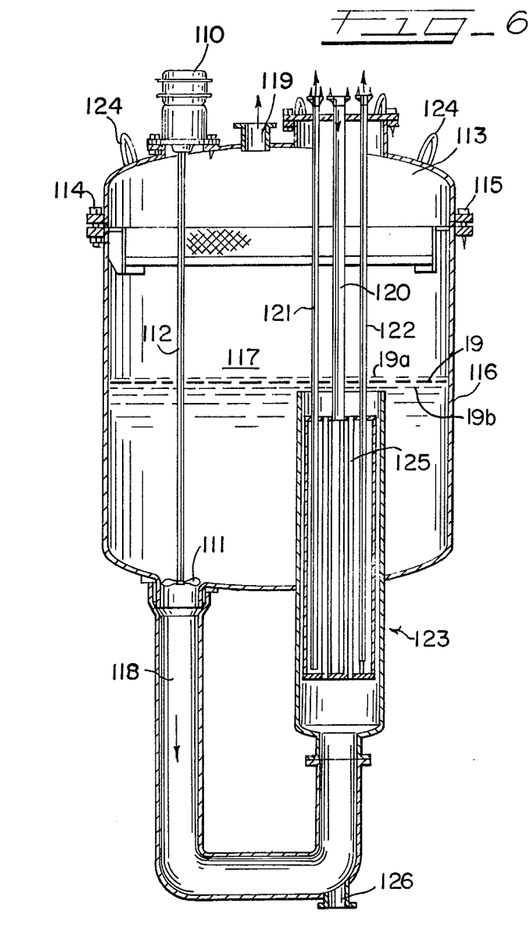
FIG. 6 is a cross-sectional view of another alternate embodiment of the invention.

Another alternate embodiment of the waste evaporation system of the invention is shown in FIG. 6. In this case, the circulation pump and heat exchanger are both contained within the evaporation chamber housing to achieve an even more compact arrangement for the system. Specifically, a circulation pump is provided which comprises a motor 110, a propeller 111, and a supporting vertical shaft 112 for the propeller. The motor is mounted on a dome-shaped cover plate 113 which is removably mounted by a plurality of bolts 114 and guide pins 115 to the body 116 of the evaporation chamber 117. The propeller 111 forces liquor downwardly through an interconnecting conduit 118 to the bottom end of the heat exchanger, which may be identical in construction to that shown in FIG. 5. The top end of the heat exchanger is open to evaporation chamber 117 so that the liquor can freely communicate with the interior of the chamber. A vertical discharge pipe section 119 is provided for conveying non-radioactive steam from the system. A steam inlet conduit 120 and two outlet conduits 121 and 122 are provided for the system heat exchanger 123. These extend upwardly through cover plate 113 and terminate with upwardly-facing flanges for connection to communicating piping.

To gain access to the circulation pump and the heat exchanger, it is only necessary to remove cover plate 113 by loosening the bolts 114 situated about its periphery. The cover plate is then lifted clear of housing 116 by means of lift rings 124 provided for that purpose. Once removed, this entire assembly, which includes propeller 111 and its associated motor and gear box 110, and the steam chest portion 125 of heat exchanger 123, can be readily positioned for convenient servicing and repair.

As in the previously described system, the propeller 111 forces circulation of the liquor from the evaporation chamber through the heat exchanger and back to the evaporation chamber. As the liquor is heated from progressive passes through the heat exchanger, it eventually reaches its flashing point whereby steam vapor is formed within the evaporation chamber. As the harmless non-radioactive water vapor is driven off through discharge port 125, the concentration of the liquor increases, until eventually a point is reached where a portion of the liquor can be drained off. This may be accomplished by means of a drain port 126, provided at the bottom of conduit 118. As in the previous examples, a drain cock 98 may be provided beneath the heat exchanger for this purpose.

It will be noted that in each of the illustrated embodiments the three stages of the evaporator can be dismantled without draining the liquor from the systems. This is significant, since no convenient storage tank will normally exist for the liquor, which may be highly radioactive and require special storage precautions. Furthermore, no liquid seals are required in connection with the circulation pumps thereby avoiding a possible maintenance requirement and eliminating a possible source of contamination. Only a simple vapor-type flange seal is required between the propeller shaft and the top plate because both of these units lie above the liquor level.

Thus, a novel evaporator system has been shown and described which provides a minimum flaking and maximum accessibility. All dismantling and maintenance can be done from above, which permits a concrete vault having but a single overhead access door to be employed to shield the evaporator system. Moreover, the unique force-flow design of the system coupled with unique positioning of the various access ports and connecting conduits, results in maximum efficiency with minimum scaling in operation.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. An evaporator system for liqueform material for operation within a radiation shield providing access to the system from overhead, said evaporator system comprising, in combination:
    chamber means for said liqueform material, said chamber means defining first and second apertures on a top portion thereof, and said liqueform material having maximum and minimum operating levels within said chamber means;
    means comprising a vertical heat exchanger for heating said fluid, said heat exchanger including a first top plate removably mounted over said first aperture in said chamber means and a steam chest suspended from first said top plate, said steam chest being submerged in said chamber means below said minimum liquid operating level and being removable from said system through said aperture;
    means comprising a circulation pump for circulating said liqueform material through said system, said circulation pump including a second top plate removably mounted over said second aperture in said chamber means, a motor mounted on said second top plate, a propeller, flow confining means in said chamber means below said minimum liquid level for said propeller, a shaft depending from said motor for supporting said propeller within said flow confining means below said minimum operating level, said propeller and shaft being removable from said system through said second aperture, said first and second apertures being above said maximum liquid operating level and of sufficient dimensions to enable said circulation pump and said heat exchanger to be removed from said system from overhead, and a vapor exhaust port in said chamber means above said maximum liquid level.

2. An evaporator system as defined in claim 1 wherein said circulation pump includes a low pressure vapor-type seal between said propeller support shaft and said second top plate.

3. An evaporator system as defined in claim 1 wherein said chamber means include an evaporation chamber and a first additional chamber, said circulation pump being contained in said first additional chamber, and said second top plate being removably secured in a generally horizontal plane to the top wall of said first additional chamber.

4. An evaporator system as defined in claim 3 wherein said chamber means includes a second additional chamber, said heat exchanger being contained in said second additional chamber, and said first top plate being removably secured in a generally horizontal plane to the top wall of said second additional chamber.

5. An evaporator system for use in a shielded enclosure including walls, a floor, and a roof having an access port therein, for processing radioactive liquid waste, said system comprising, in combination:
    means comprising an upright chamber in said enclosure below said access port for at least partially converting said liquid waste to vapor, said liquid waste having a maximum and a minimum operating level in said chamber, and said chamber having a head portion removably secured thereto along a generally horizontal plane above said maximum liquid level, and a vapor exhaust port above said maximum liquid level;
    means comprising a circulation pump for causing said liquid waste to circulate through said system, said circulation pump having a propeller, flow confining means in said chamber below said minimum liquid level for said propeller, a motor mounted on said head portion above said maximum liquid level, and a shaft extending downwardly from said motor to said propeller to support said propeller below said minimum liquid level within said flow confining means; and
    vertical heat exchanger means comprising a steam chest suspended from said head portion in said chamber and submerged for heating said liquid waste, said heat exchanger being submerged in said liquid substantially below said minimum liquid level for heating said liquid waste as it circulates through said system.

6. An evaporator system as defined in claim 5 wherein said head portion includes first and second apertures, said circulation pump is secured to a first top plate removably mounted over said first aperture, and said steam chest is secured to a second top plate removably mounted over said second aperture, said first and second apertures being dimensioned to allow said circulation pump and heat exchanger to be removed therethrough, respectively.

7. An evaporator system as defined in claim 6 wherein said circulation pump includes a low-pressure vapor-type seal between said first removable top plate and said propeller support shaft.

8. An evaporator system for concentrating radioactive waste within a radiation shield whereby access to the system is possible substantially only from overhead, said system comprising, in combination:

means comprising a cylindrical evaporation chamber for at least partially converting said radioactive waste to a nonradioactive vapor, said waste having a maximum and a minimum liquid operating level within said chamber, and said chamber having a vapor exhaust port above said maximum level;

heat exchanger means for heating said liquid waste, said heat exchanger means including a vertical cylindrical chamber having a first access aperture in the top wall thereof above said maximum liquid operating level, a top plate mounted over said first access aperture, and a steam chest, said steam chest being suspended from said top plate and submerged in said liquid substantially below said minimum liquid operating level and said heat exchanger means being removable through said first access aperture for servicing; and means comprising a circulation pump for circulating said liquid waste through said evaporation chamber and said heat exchanger chamber, said circulation pump including a vertical cylindrical chamber having a second access aperture in the top wall thereof above said maximum liquid operating level, an access plate mounted over said second access aperture, a motor mounted on said access plate, a propeller, a shaft extending from said motor through said access plate into said cylindrical pump chamber for supporting said propeller below said minimum liquid operating level, a low pressure vapor seal between said access plate and said shaft above said maximum liquid operating level, said propeller and shaft assembly being removable through said second access aperture for servicing, and conduit means for establishing a cyclic flow path for said liquid between said evaporation chamber, said heat exchanger chamber, and said circulation pump chamber.

9. An evaporator system as defined in claim 8 wherein said conduit means comprise substantially horizontal pipe segments below said minimum liquid operating level.

10. An evaporator system of the type adapted for erection within the confines of an enclosure closed except for an access port in the roof thereof, comprising, in combination:

an evaporation chamber, a pump chamber and a heat exchanger chamber, each of said chambers including an upright body portion and a head portion removably secured in a generally horizontal plane to each such body portion;

conduit means interconnecting said body portions for establishing a cyclic sequential flow path for liquid through said chambers, said liquid having maximum and minimum levels in said system below said head portions of said chambers;

means comprising a circulation pump mounted on said head portion of said pump chamber for circulating said liquid along said flow path, said circulation pump including a propeller, a motor mounted on said head portion, flow confining means in said pump chamber, and a shaft extending from said motor into said body portion of said pump chamber for supporting said propeller within said flow confining means below said minimum level of said liquid, and a pump shaft seal between said head portion and said shaft.

11. An evaporator system for processing radioactive liquid waste, for use within the interior of a radiation-shielding enclosure, said enclosure having walls, a floor, and a roof including an access port, said evaporator system comprising, in combination:

means comprising an evaporation chamber for converting said liquid waste to non-radioactive vapor, said chamber including a removable head portion and a vapor exhaust port;

first and second additional chambers within said shielded enclosure below said access port, each of said additional chambers having a head portion removably secured thereto along a generally horizontal plane;

conduit means interconnecting said first and second additional chambers with said evaporation chamber for establishing a cyclic sequential flow path for said liquid waste between said chambers, said liquid waste having a common maximum and a common minimum level within said chambers, and said head portions being secured to said additional chambers about said maximum liquid operating level;

means comprising a circulation pump mounted on the head portion of said first additional chamber for causing said liquid waste to sequentially flow between said chambers, said circulation pump having a propeller, a motor mounted on said head portion above said maximum level of said liquid waste, a shaft extending downwardly from said motor to said propeller to support said propeller below said minimum level of said liquid waste, and a pump shaft seal above said maximum level of said liquid waste; and vertical heat exchanger means including a steam chest suspended from the head portion of said second additional chamber and submerged in said liquid waste substantially below said minimum level for heating said liquid waste as it circulates through said second chamber.

12. An evaporator system as defined in claim 11 wherein said pump shaft seal is a low pressure vapor-type seal.

13. An evaporator system for concentrating radioactive waste within a radiation shield whereby access to the system is possible substantially only from overhead, said system comprising, in combination:

evaporation means comprising a cylindrical chamber for converting said radioactive waste to a non-radioactive vapor, said waste having a maximum and a minimum operating level within said chamber, and said chamber having a vapor exhaust port above said maximum level;

vertical heat exchanger means including a cylindrical chamber having an access aperture above said maximum liquid operating level, an access plate mounted over said access aperture, and a steam chest for heating said radioactive waste, said steam chest being suspended in said heat exchanger chamber from said access plate substantially below said minimum liquid operating level and being removable through said access plate for servicing; and means including a circulation pump for circulating said liquid waste through said evaporation chamber and said heat exchanger chamber, said circulation pump including a cylindrical chamber having an access aperture disposed above said maximum liquid operating level, a top plate mounted over said pump access aperture, a motor mounted on said top plate, a propeller, a shaft extending from said motor through said top plate into said cylindrical pump chamber for supporting said propeller below said minimum liquid operating level, a low pressure vapor seal between said top plate and said shaft above said maximum liquid operating level, and conduit means for establishing a cyclic flow path for said liquid between said evaporation chamber, said heat exchanger chamber, and said circulation pump chamber, said chambers being arranged in a triangular upstanding parallel-axis spaced-apart configuration.

* * * * *

UNITED STATES PATENT AND TRADEMARK OFFICE
CERTIFICATE OF CORRECTION

PATENT NO. : 3,933,576
DATED : January 20, 1976
INVENTOR(S) : William E. Rushton It is certified that error appears in the above-identified patent and that said Letters Patent are hereby corrected as shown below:

Column 3, Line 34, delete "cross sectional" and insert in place thereof --plan view--

Column 3, Line 36, delete "plan view" and insert in place thereof --cross sectional--

Signed and Sealed this

Seventeenth Day of August 1976

[SEAL]

Attest:

RUTH C. MASON
Attesting Officer

C. MARSHALL DANN
Commissioner of Patents and Trademarks